(12) United States Patent
Yang et al.

(10) Patent No.: US 11,421,939 B2
(45) Date of Patent: Aug. 23, 2022

(54) PLATE HEAT EXCHANGER WITH INLET DISTRIBUTOR

(71) Applicant: NATIONAL CENTRAL UNIVERSITY, Taoyuan (TW)

(72) Inventors: Chien-Yuh Yang, Taoyuan (TW); Fu-Chen Lin, Taoyuan (TW); Ziemowit Malecha, Taoyuan (TW); Pawel Pluszka, Taoyuan (TW)

(73) Assignees: NATIONAL CENTRAL UNIVERSITY, Taoyuan (TW); WROCLAW UNIVERSITY OF SCIENCE AND TECHNOLOGY, Wroclaw (PL)

( * ) Notice: Subject to any disclaimer, the term of this patent is extended or adjusted under 35 U.S.C. 154(b) by 41 days.

(21) Appl. No.: 16/571,590

(22) Filed: Sep. 16, 2019

(65) Prior Publication Data
US 2021/0080188 A1 Mar. 18, 2021

(51) Int. Cl.
*F28D 9/00* (2006.01)
*F28F 9/007* (2006.01)
(Continued)

(52) U.S. Cl.
CPC .............. *F28D 9/0075* (2013.01); *F28F 9/22* (2013.01); *F28F 9/0268* (2013.01); *F28F 2009/224* (2013.01)

(58) Field of Classification Search
CPC ...... F28F 9/22; F28F 9/0268; F28F 2009/224; F28D 9/0075
See application file for complete search history.

(56) References Cited

U.S. PATENT DOCUMENTS

| | | | | |
|---|---|---|---|---|
| 2,099,186 A | * | 11/1937 | Anderegg | F25B 39/028 165/174 |
| 3,254,707 A | * | 6/1966 | Ferguson | F28F 9/0231 165/174 |

(Continued)

OTHER PUBLICATIONS

W.-K. Liao et al. "An Experimental and Numerical Analysis of Air-Water Flow Distribution in Multichannels With Parallel Dividing Plates in the Inlet Header"; The 29th International Symposium on Transport Phenomena (ISTP29); Oct. 30-Nov. 2, 2018, Honolulu, USA; pp. 1-8.

*Primary Examiner* — Leonard R Leo
(74) *Attorney, Agent, or Firm* — Muncy, Geissler, Olds & Lowe, P.C.

(57) ABSTRACT

An inlet distributor for a plate heat exchanger is disclosed. The plate heat exchanger includes a plate set. A fluid channel is formed between each two adjacent plates of the plate set, and each plate has first fluid openings and second fluid openings to form inlet channels and outlet channel for fluid to alternatively flow into and out of the fluid channels. The inlet distributor includes a collecting pipe, and at least one horizontal partition plate disposed on the inner wall of the collecting pipe. The collecting pipe can be mounted on an inlet end of the inlet channel, and the horizontal partition plate is coaxially extended into the inlet channels. When the fluid flows into the collecting pipe, the horizontal partition plate separates liquid and vapor of the fluid and guides the vapor to fluid channel in different position away from the inlet end, along the horizontal partition plate.

4 Claims, 10 Drawing Sheets

(51) Int. Cl.
*F28F 9/22* (2006.01)
*F28F 9/02* (2006.01)

(56) References Cited

U.S. PATENT DOCUMENTS

| | | | | |
|---|---|---|---|---|
| 5,388,398 | A * | 2/1995 | Kadambi | F28D 9/0018 165/174 |
| 7,549,466 | B2 * | 6/2009 | Hayashi | F28D 1/0341 165/174 |
| 7,669,643 | B2 * | 3/2010 | Ekelund | F28F 3/046 165/174 |
| 7,841,393 | B2 * | 11/2010 | Sekito | F28D 1/05366 165/174 |

* cited by examiner

PLATE HEAT EXCHANGER WITH INLET DISTRIBUTOR

BACKGROUND OF THE INVENTION

1. Field of the Invention

The present invention relates to an inlet distributor for a plate heat exchanger, and more particularly to an inlet distributor which can use a horizontal partition plate to separate liquid and vapor of fluid flowing through a collecting pipe, and then guide the vapor to a fluid channel, in different position, of the plate heat exchanger away from an inlet end of the plate heat exchanger, so as to achieve the purpose of uniformly distributing a mixture of liquid and vapor in a middle or low flow rate, and improving heat transfer performance of the plate heat exchanger.

2. Description of the Related Art

In recent years, plate heat exchangers are widely used in refrigeration industry, air conditioning industry, heat pump system industry, heat treatment industry, petrochemistry industry, energy industry, waste heat recovery industry, and other industries. The structure and operation principle of the plate heat exchanger is to use metal sheets which have ripple patterns and are stacked together. Multiple fluid channels are formed between the metal sheets, so that heat can be exchanged between two fluids (such as liquid to liquid or liquid to vapor) based on the heat transfer properties of the metal sheets, to achieve heating or cooling purpose. The plate heat exchanger has advantages of compact structure, high heat transfer efficiency, small size and easy maintenance and inspection.

Figure 10:
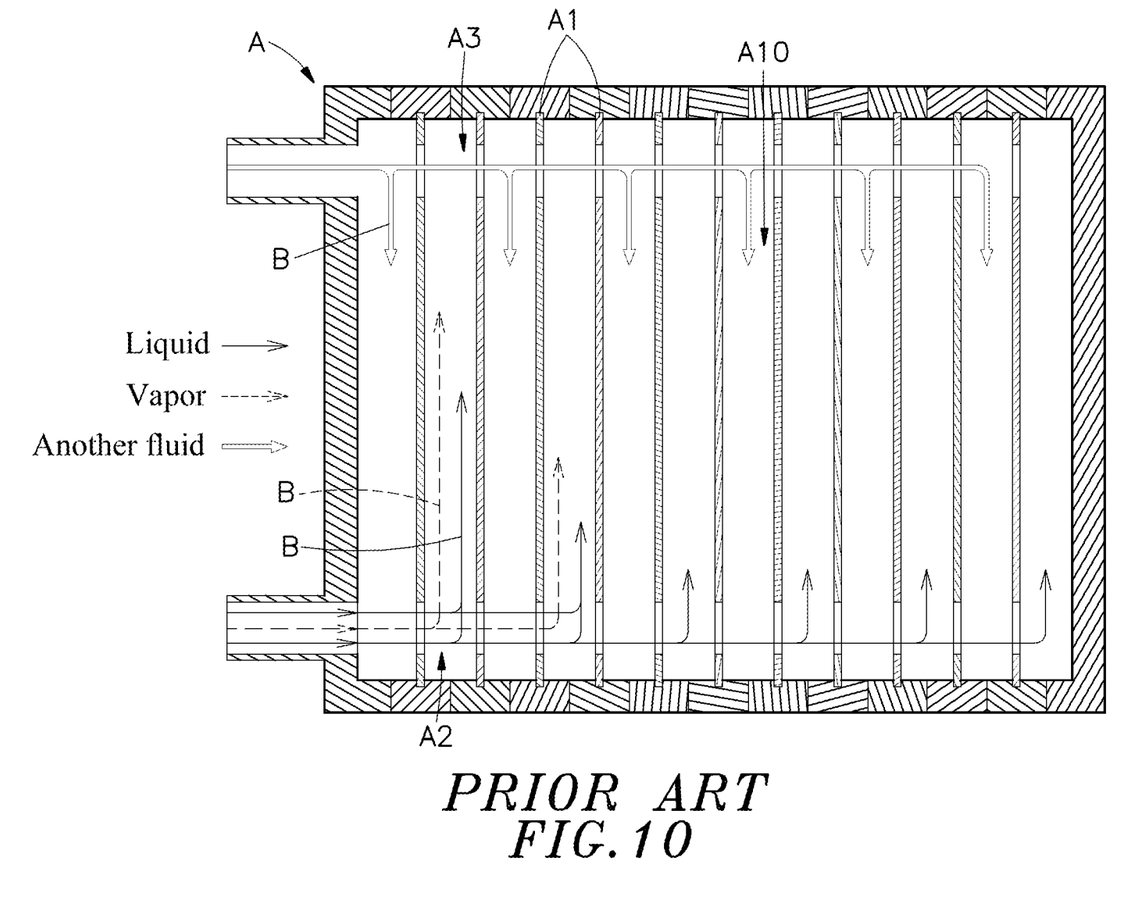
FIG. 10 is a schematic cross-sectional view of a conventional plate heat exchanger.

As shown in FIG. 10, a plate heat exchanger A includes a plate set A1, and fluid channels A10 formed between each two adjacent plates, and multiple inlet channels A2 and outlet channels A3 formed by corresponding openings in four corners of the plates and configured to allow fluid B to flow into and out of the fluid channels A10 for heat exchange. In practical applications, the fluid B of the plate heat exchanger A is usually two-phase mixing fluid, such as the mixing fluid of liquid and vapor, instead of single-phase fluid, and when the two-phase fluid (such as refrigerant) flows into the inlet channel of the plate heat exchanger A, the inertial force and gravity of liquid (such as refrigerant liquid) is larger than that of vapor (such as the refrigerant vapor), and the momentum of liquid is much larger than that of vapor, so it causes that most of liquid flows forwardly to the inlet channel A2 of the plate heat exchanger A at an rear end away from the inlet collection channel, and most of vapor flows upwardly through the inlet channel A2 of the plate heat exchanger A near the collection inlet at the front end of the plate heat exchanger A, and it causes uneven distribution of liquid and vapor flowing into the fluid channels A10, and affects the heat transfer property of the plate heat exchanger A; as a result, the heat exchange efficiency of the plate heat exchanger A is reduced.

Therefore, in order to solve the problem of uneven distribution of fluid at the flow channel inlet of the plate heat exchanger, the conventional plate heat exchanger is usually provided with a distributor disposed at the fluid inlet of the flow channel thereof and configured to reduce the area of the fluid inlet, so as to limit the flow of fluid into the flow channel, or increase a flow rate of the fluid in the flow channel, thereby achieving a uniform distribution of the fluid in the flow channel. However, the inlet distributor may affect the pressure drop generated by the fluid when the fluid flows into the plate heat exchanger, and also has an absolute influence on whether the distribution of fluid between the various flow channels is uniform. When the plate heat exchanger has more plates, the pressure drop concentrates on the inlet of the flow channel, and for this reason, the pressure drop at the inlet of the flow channel is also an important factor for determining whether the overall heat transfer performance of the plate heat exchanger is good. The conventional distributor has a reduced area of the fluid inlet to effectively increase the flow rate of the fluid in the flow channel but the flow pressure drop also increases, and it affects the flowability of the fluid and causes unnecessary pressure loss and non-uniform fluid distribution, and further impacts the heat transfer performance of the plate heat exchanger.

SUMMARY OF THE INVENTION

In order to solve above-mentioned conventional problems and drawbacks, inventors develop an inlet distributor for a plate heat exchanger according to collected data, multiple tests and modifications, and years of research experience.

An objective of the present invention is that a plate heat exchanger comprises fluid channels formed between each two adjacent plates of the plate set, and each plate has a plurality of first fluid openings and second fluid openings to form a plurality of inlet channels and outlet channel to allow the fluid to alternatively flow into and out of the fluid channels for performing heat exchange, and the inlet distributor includes a collecting pipe and at least one horizontal partition plate disposed on a pipe wall of the collecting pipe, and the collecting pipe and the at least one horizontal partition plate can be mounted in an inlet end of the inlet channel, the at least one horizontal partition plate is also coaxially extended into the inlet channel; when the fluid flows into the collecting pipe, the at least one horizontal partition plate can separate liquid and vapor of the fluid flowing therethrough, and then guide the vapor, along the horizontal partition plate, to the fluid channels in different positions away from the inlet end, so as to achieve the purpose of uniformly distributing the mixture of the liquid and the vapor under a middle or low flow rate; furthermore, the horizontal partition plate can be a metal sheet (such as a steel sheet) which is able to reduce an increase of a pressure drop of the fluid, so that the heat transfer performance of the plate heat exchanger can be indeed effectively improved.

Another objective of the present invention is that according to characteristic of the liquid and vapor of the liquid distributing on the pipe wall during a high-speed flow rate, the inlet distributor can use multiple different lengths of horizontal partition plates to separate the liquid and vapor of the fluid flowing through the collecting pipe, and then guide the liquid and vapor to the different positions of the plate heat exchanger, thereby controlling the flow rate of the fluid flowing into the fluid channel, and the number and lengths of the horizontal partition plates can be changed according to a size of the plate heat exchanger, or size of the inlet end of the inlet channel, or an area of the opening formed on the pipeline of the collecting pipe, or can be adjusted adaptively according to a total length of the plate heat exchanger or the plate set, and the number of the stacked plates.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 1:
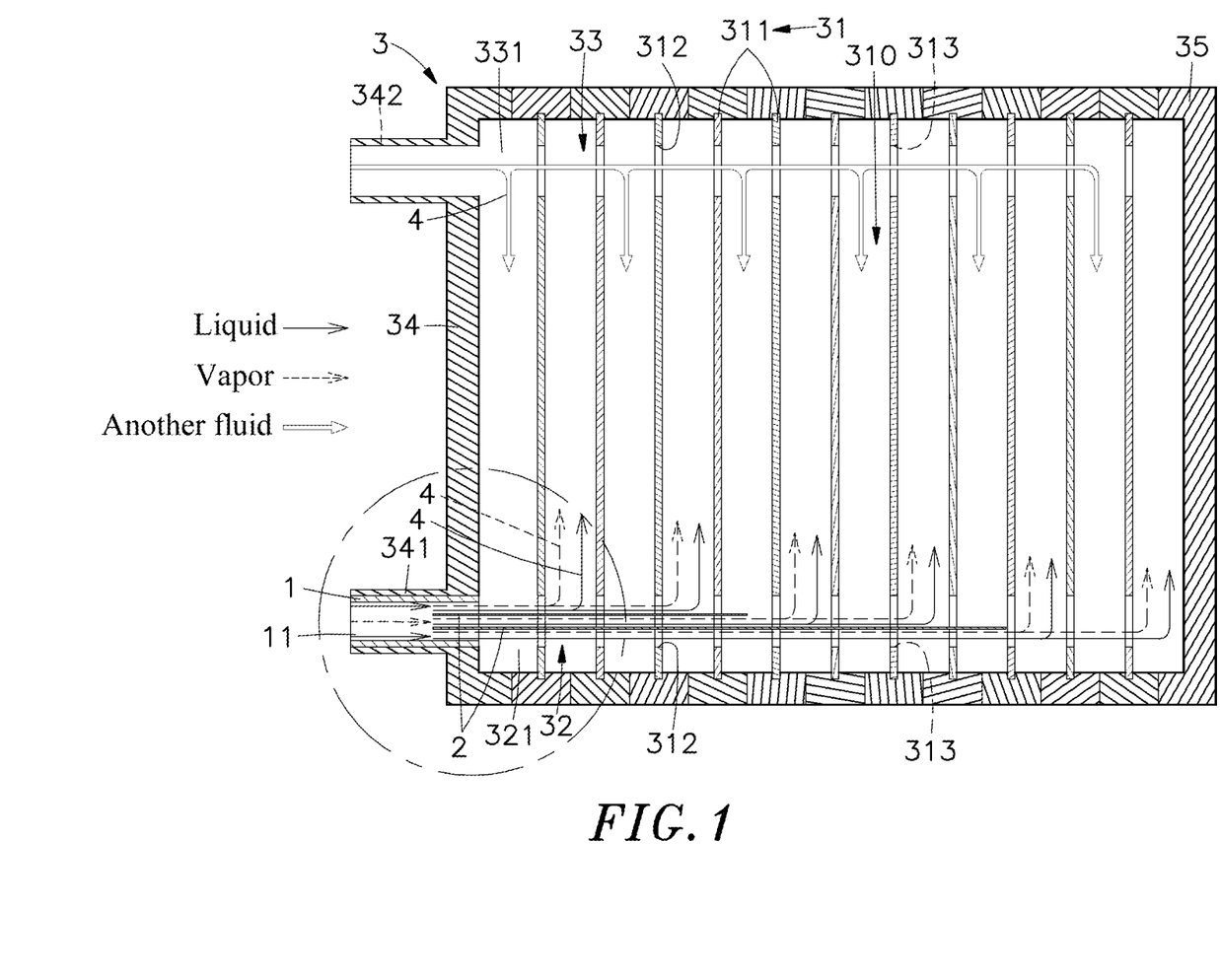
FIG. 1 is a schematic cross-sectional view of a plate heat exchanger mounted with the inlet distributor, according to the present invention.

Please refer to FIGS. 1 to 5, which are schematic cross-sectional views of a plate heat exchanger mounted with an inlet distributor of the present invention, and an enlarged view of a part (A) of FIG. 1, respectively. As shown in FIGS. 1 to 5, the inlet distributor comprises a collecting pipe 1 and at least one horizontal partition plate 2.

The collecting pipe 1 can include a pipeline 11 formed in the inside thereof, the pipeline 11 comprises a first opening 111 and a second opening 112 formed on two ends thereof, respectively.

The at least one horizontal partition plate 2 can be a rectangular sheet made by, such as, stainless steel, iron, iron palladium, nickel or nickel-based alloy (such as nickel-molybdenum-chromium alloy). A shorter side of an end of the horizontal partition plate 2, or two opposite longer sides of an end of the horizontal partition plate 2 can be disposed on an inner wall of the pipeline 11 or the second opening 112 by using soldering manner, riveting manner, mounting manner, or other combining manner, and other end of each horizontal partition plate 2 can be extended out of the pipeline 11 to form a suspending state.

Figure 3:
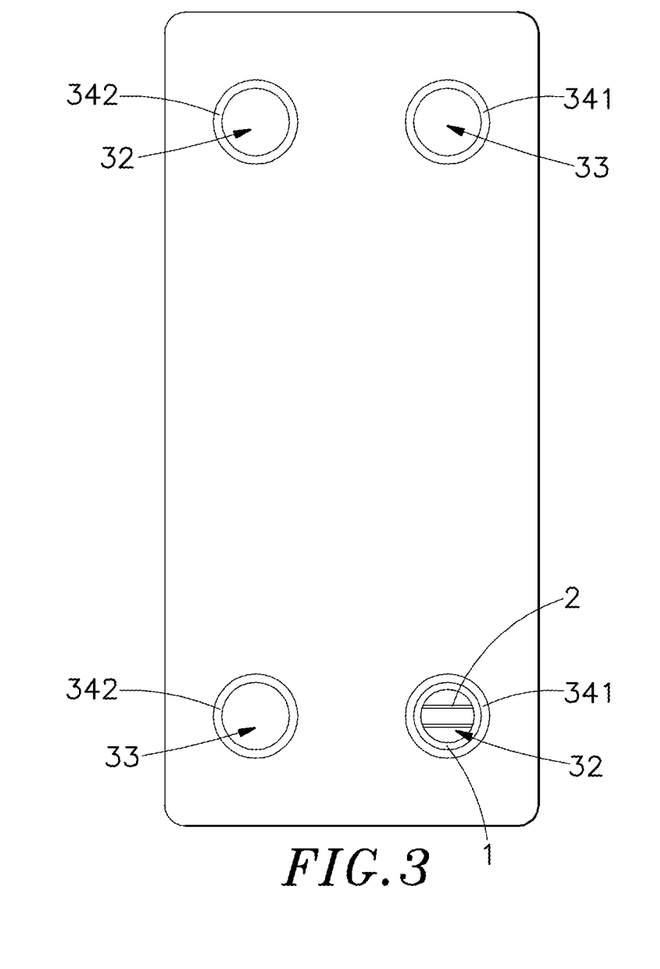
FIG. 3 is an elevational view of a plate heat exchanger of the present invention.

The inlet distributor of the present invention can be applied for refrigeration, for example, the inlet distributor can be used in a condenser or an evaporator. In an embodiment, the inlet distributor of the present invention can be applied for heating-ventilation-and-air conditioning (HVAC), for example, the inlet distributor can be mounted in an intermediate heat exchanger used in boiler or high rise building; the inlet distributor of the present invention can be applied for industrial cooling and heating apparatus in different industry, such as mechanical industry, metallurgical industry, gas turbine industry, electrical power industry; or, the inlet distributor of the present invention can be applied for other occasion where the a plate heat exchanger 3 is required for heating or cooling. The plate heat exchanger 3 comprises a plate set 31. The plate set 31 includes plates 311 disposed in interval and face-to-face. Each fluid channel 310 is formed between each two adjacent plates 311 of the plate set 31, and each plate 311 has multiple first fluid openings 312 and second fluid openings 313 corresponding in position to each other and formed at four corners thereof. Each of a plurality of washers can be disposed between each two adjacent plates 311 for sealing, or each two adjacent plates 311 can be combined integrally by a direct plate-to-plate soldering manner, so that the plurality of first fluid openings 312 and second fluid openings 313 can form a plurality of inlet channels 32 and outlet channels 33 to allow at least one fluids 4 (such as water, refrigerant, mixture of water and refrigerant, or other working fluid with mixed vapor and liquid) to alternatively flow into and out of the fluid channel 310 for performing heat exchange, and each two adjacent plates 311 can be indeed sealed tightly to prevent side leakage or communication between the plates 311. The plate set 31 can be tightly locked and fastened on a front plate 34 and a rear plate 35 by frames (such as upper and lower support frames) and bolts. The front plate 34 can have a plurality of first fluid ports 341 and second fluid ports 342 disposed correspondingly in position to the inlet channel 32 and the outlet channel 33, respectively.

After the fluid 4 flows into an inlet end 321 of the inlet channel 32 via the first fluid port 341 at a lower part of the front plate 34 and then flows into the fluid channel 310 via the first fluid openings 312 at the lower parts of the plates 311 of the plate set 31, the fluid 4 can then flow into the outlet channel 33 via the first fluid opening 312 on an upper part of the plate 311, and then flow out of the outlet channel 33 via the first fluid port 341 on the upper part of the front plate 34 and an outlet end 331, so as to form a first flow channel for allowing the fluid 4 to flow into and out of the plate heat exchanger 3. Similarly, when another fluid 4 flows into the inlet end 321 of another inlet channel 32 via the second fluid port 342 on the upper part of the front plate 34, and then flows into the fluid channel 310 via the second fluid openings 313 on the upper parts of the plates 311 of the plate set 31, and the fluid 4 can flow into the another outlet channel 33 via the second fluid opening 313 at a lower part of the plate 311, and then flow out of the second fluid port 342 on the lower part of the front plate 34 and the outlet end 331, so as to form a second flow channel for inflow and outflow of another fluid 4. The first flow channel and the second flow channel are not in communication with each other.

In this embodiment, the plate 311 used in the plate heat exchanger 3 can have mountain-shaped patterns, Z-shaped patterns, or convex and concave patterns; however, the present invention is not limited to above-mentioned examples. The plate heat exchanger 3 can have different type and different number of the plates 311 upon different design, for example, the plate heat exchanger 3 can be a plate heat exchanger having seal washers, a soldering plate heat exchanger, a helical plate heat exchanger, or a roll-plate heat exchange. It should be noted that the detailed structure of the plate 311 is not the key feature of the present invention, and any structure of the plates 311 just mainly provides heat transfer function to the plate heat exchanger 3 for heat exchange to quickly heat or cool the fluid 4 flowing via the at least two flow channels not in communication with each other, so they are illustrated with the main feature of the present invention in the following paragraphs.

Figure 2:
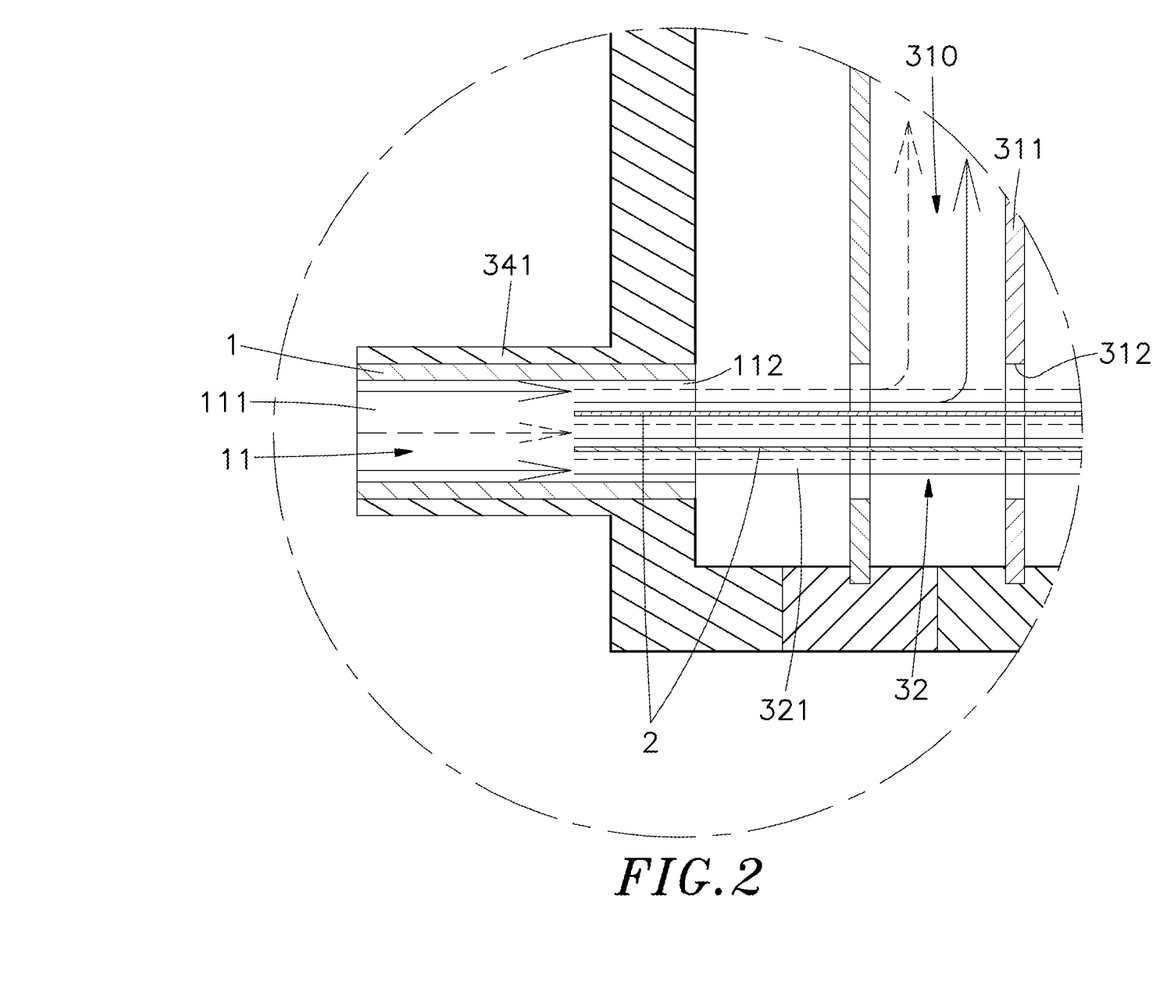
FIG. 2 is an enlarged view of a part (A) of FIG. 1, according to the present invention.

In order to assemble the inlet distributor of the present invention, the collecting pipe 1 of the inlet distributor can be mounted on the inlet end 321 of one of the inlet channels 32 on the bottom of the plate heat exchanger 3 or mounted on the first fluid port 341 of the front plate 34 in communication with the inlet end 321, by soldering, screwing or other combining manner, and the horizontal partition plate 2 is extended out of the other end of the second opening 112 and coaxially inserted into the inlet channel 32, and make the plate surfaces of the horizontal partition plates 2 correspond in position to the multiple fluid channels 310 of the plate set 31, thereby completing the assembly of the plate heat exchanger of the present invention.

In this embodiment, when the fluid 4 flows into the plate heat exchanger 3 via the first fluid port 341 of the front plate 34, the inlet distributor mounted on the inlet end 321 of the inlet channel 32 can use the at least one horizontal partition plate 2 to separate, according to the characteristic of the liquid distributing on the pipe wall under the high-speed flow rate, the liquid and vapor (such as steam) of the fluid 4 flowing through the pipeline 11 of the collecting pipe 1 at the inlet end 321, so as to make more vapor flow into the upper and lower parts of the horizontal partition plate 2, as shown in FIG. 2, and the vapor is then guided to the fluid channels 310, in different positions, of the inlet channel 32 away from the inlet end 321 along the horizontal partition plates 2, thereby controlling the flow rate of the mixture of the liquid and the vapor flowing into the fluid channel 310. As a result, the purpose of uniformly distributing the fluid 4 in the fluid channel 310 to significantly increase the heat transfer performance of the plate heat exchanger 3 can be achieved. The horizontal partition plate 2 can be made by a stainless steel, so as to reduce the increase of the pressure drop caused by the fluid 4 in a high-flow-rate state or viscous state, thereby effectively increasing the heat exchange efficiency of the plate heat exchanger.

Figure 4:
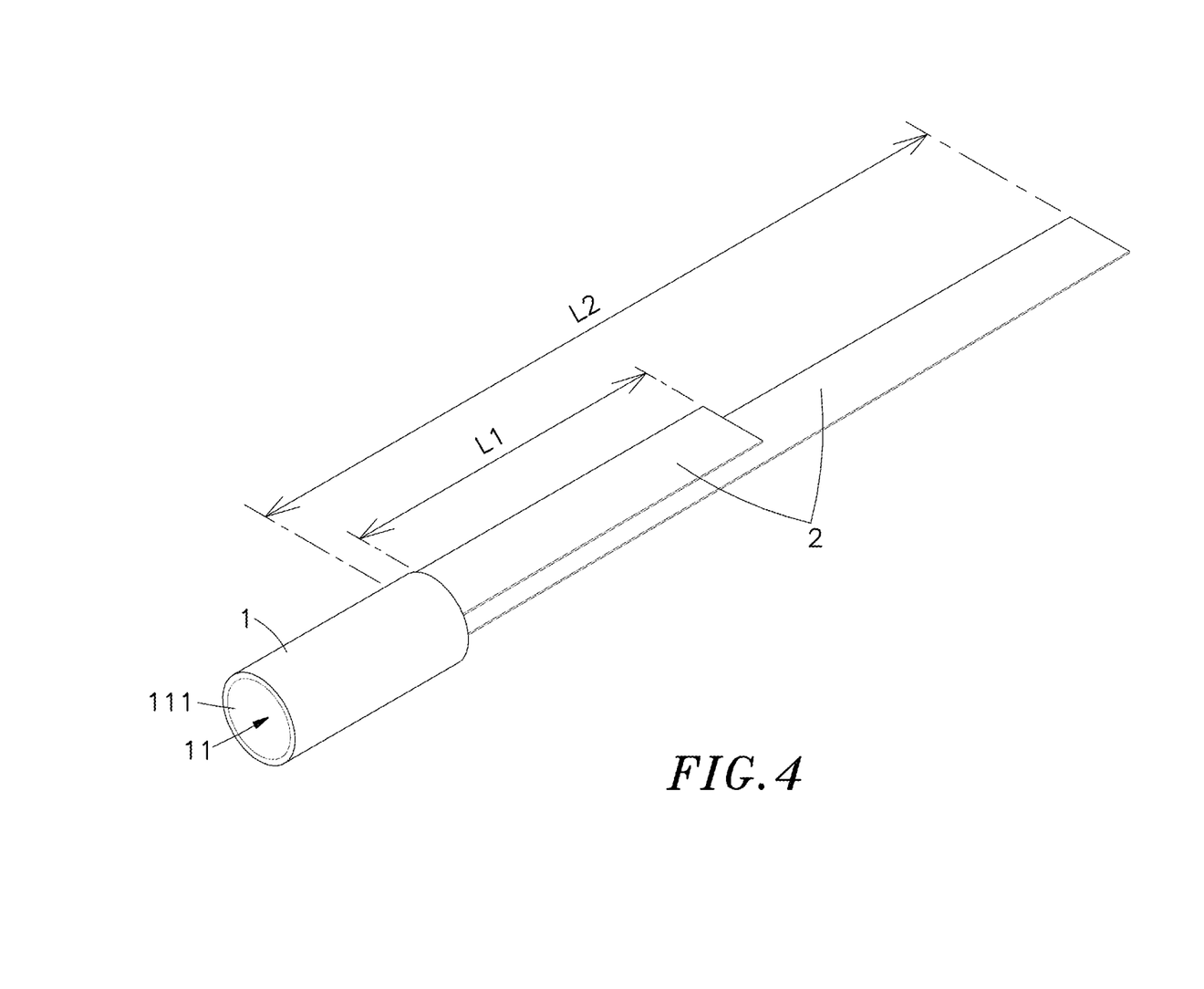
FIG. 4 is an elevational view of a preferred embodiment of an inlet distributor of the present invention.
Figure 5:
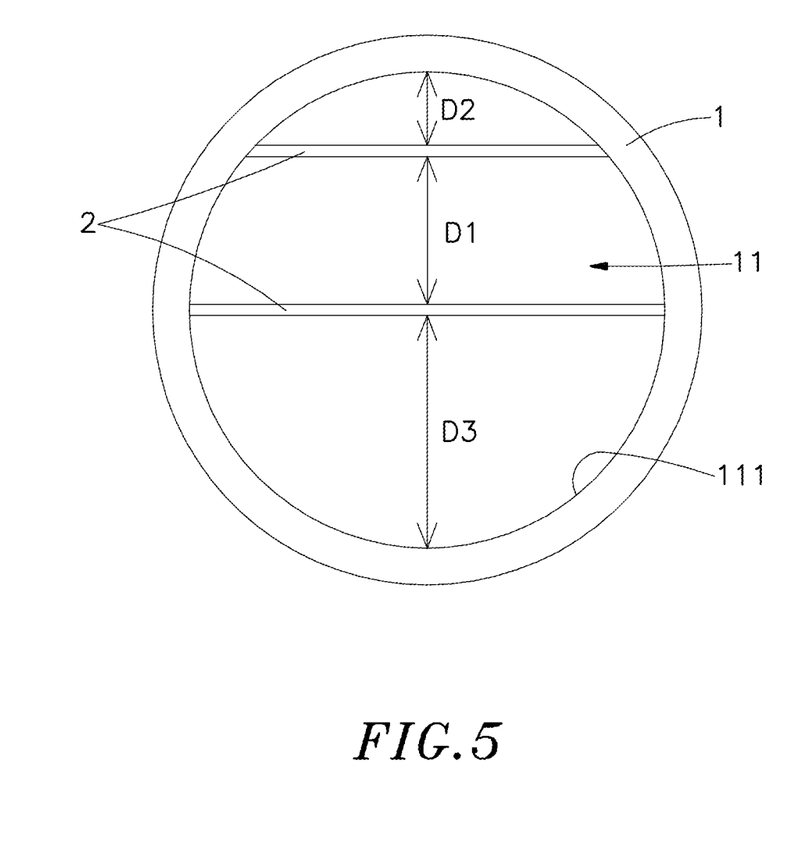
FIG. 5 is an elevational view of a preferred embodiment of an inlet distributor of the present invention.

Furthermore, in a preferred embodiment, the number of the plates 311 of the plate set 31 of the plate heat exchanger 3 can be in a range of twenty to seventy; however, in an actual application, the plate heat exchanger 3 can be provided with different number of plates upon different design, for example, the sixty fluid channels 310 can be formed between the plate set 31, the front plate 34 and the rear plate 35, and the inlet distributor can be mounted on the inlet end 321 of the inlet channel 32, and the inlet distributor can have two horizontal partition plates 2 disposed on the inner wall of the collecting pipe 1 thereof in a vertical direction. The two horizontal partition plates 2 are arranged in un-equal interval, and configured to partition the pipeline 11 to form three openings having different areas for flowing the fluid 4, so that three flowing streams can be formed when the fluid 4 flows through the inlet distributor. The area of each opening can be appropriately adjusted according to the number of the horizontal partition plates 2, so as to limit the flow rate of the fluid 4 guided to the inlet channel 32 along the multiple horizontal partition plates 2, or improve the flow speed of the fluid 4 for uniformly distributing the fluid 4.

Furthermore, the two upper and lower horizontal partition plates 2 disposed in the collecting pipe 1 of the inlet distributor can be extended from the inlet end 321 of the plate heat exchanger 3 to the twentieth and the fortieth fluid channels 310, respectively, and a length L1 of the upper horizontal partition plate 2 is shorter than a length L2 of the lower horizontal partition plate 2; however, in an actual application, the collecting pipe 1 can be provided with multiple horizontal partition plates 2 disposed in the inside thereof, the lengths of the horizontal partition plates 2 are sequentially increased from top to bottom and layer by layer, and the length of the horizontal partition plate 2 can be proportional to the number of the plates 311 of the plate set 31. Furthermore, in this embodiment, the two upper and lower horizontal partition plates 2 can be spaced apart from each other by an interval D1, and the two horizontal partition plates 2 can be spaced apart from the wall of the pipeline 11 by maximal intervals of D2 and D3 in a vertical direction, respectively, and the interval D1 between the two horizontal partition plates 2 is higher than the maximal interval D2 between the upper horizontal partition plate 2 and the wall of the pipeline 11 in a vertical direction, but the interval D1 is lower than the maximal interval D3 between the lower horizontal partition plate 2 and the wall of the pipeline 11 in a vertical direction. As a result, the two horizontal partition plates 2 disposed in the collecting pipe 1 and arranged in unequal interval can be used to limit the flow rate of the fluid 4 or improve the flow speed of the fluid 4.

Figure 6:
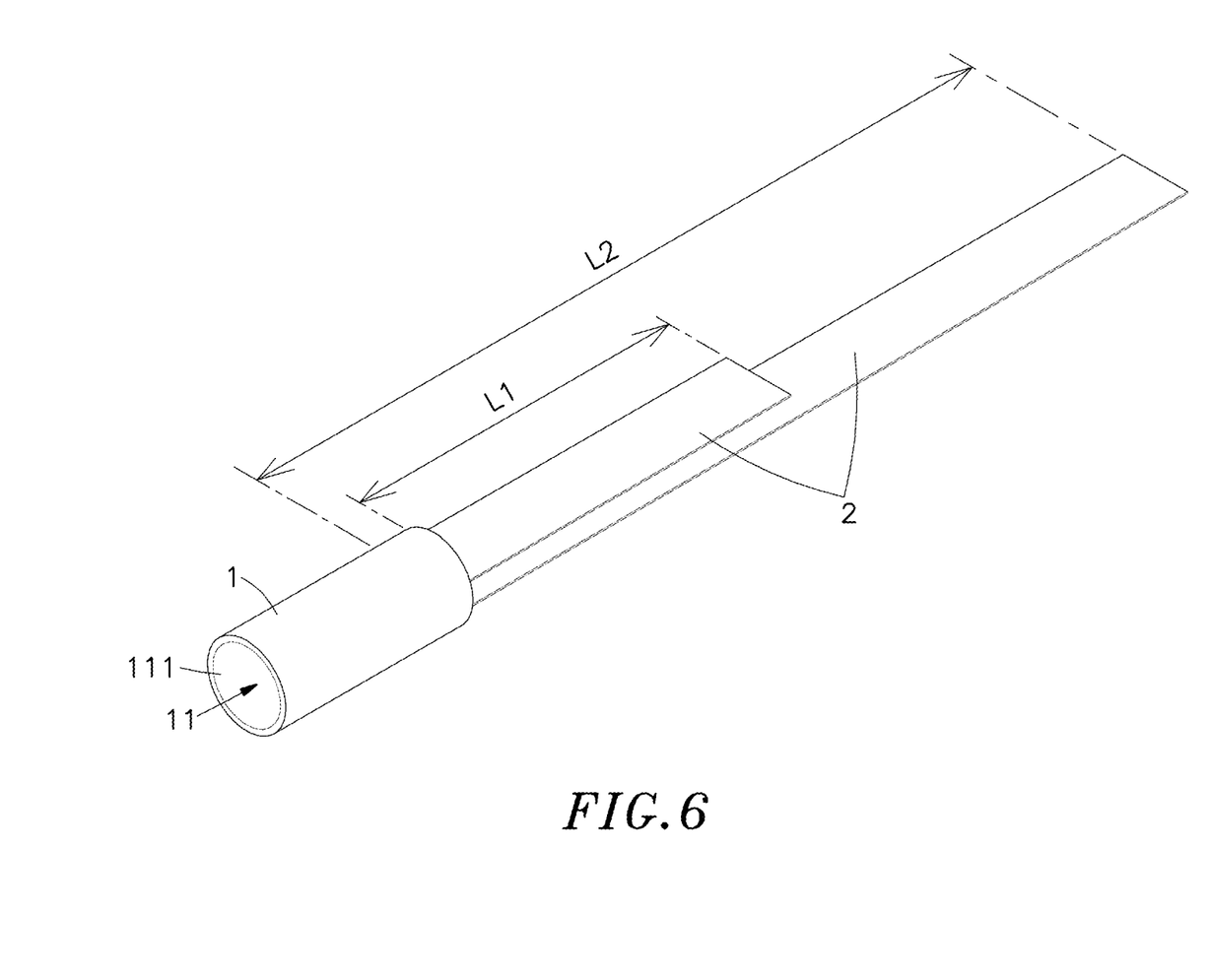
FIG. 6 is a perspective view of another preferred embodiment of an inlet distributor of the present invention.
Figure 7:
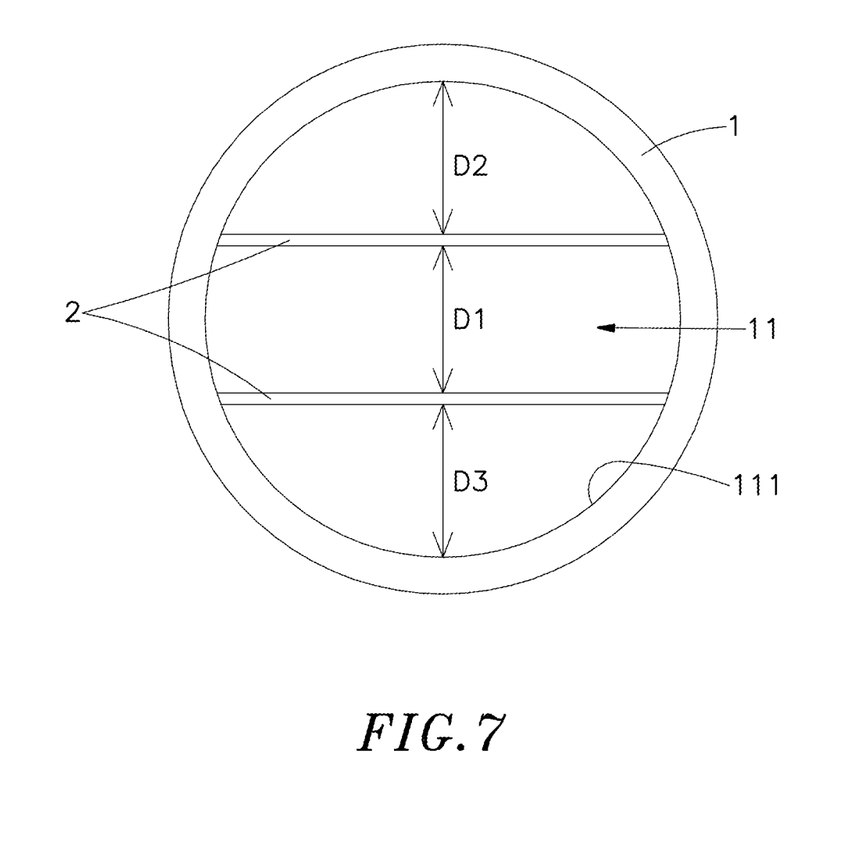
FIG. 7 is an elevational view of another preferred embodiment of an inlet distributor of the present invention.

Please refer to FIGS. 6 and 7, which are a perspective view and an elevational view of another preferred embodiment of the present invention, respectively. As shown in FIGS. 6 and 7, the structure of the inlet distributor of this embodiment is substantially the same as that of the inlet distributors of FIGS. 4 and 5, but the two horizontal partition plates 2 of this embodiment are disposed on the inner wall of the collecting pipe 1 in a vertical direction and arranged in equal interval, and the two horizontal partition plate 2 are used to partition the pipeline 11 to form the three openings having the same areas for flowing the fluid 4. Therefore, the difference between the inlet distributor of this embodiment and the inlet distributor of previous embodiment is that the different areas of the openings of the partitioned collecting pipe 1 formed by the horizontal partition plates 2; in other words, the interval D1 between the upper and lower horizontal partition plates 2 is equal to the interval D2 between the upper horizontal partition plate 2 and the wall of the pipeline 11, and is also equal to the interval D3 between the lower horizontal partition plate 2 and the wall of the pipeline 11, so that the fluid 4 flowing into the inlet channel 32 through the horizontal partition plates 2 can form a stable laminar flow state, and the increase of the pressure drop can be reduced.

Furthermore, the inlet distributor has at least one horizontal partition plate 2 disposed on the wall of the pipeline 11 of the collecting pipe 1, the collecting pipe 1 can be mounted in the inlet end 321 of the inlet channel 32 of the plate heat exchanger 3 for inflow of the fluid 4. The at least one horizontal partition plate 2 is extended out of the pipeline 11 and coaxially inserted into the inlet channel 32. Furthermore, the number of the horizontal partition plate 2 can be one or multiple according to the size of the inlet end 321 of the inlet channel 32, and the length of the horizontal partition plate 2 can be adaptively increased proportionally according to the number of the plates 311 of the plate set 31. In an embodiment, the length of the horizontal partition plate 2 can be one-third to two-thirds of the total length of the plate heat exchanger 3 or the plate set 31; preferably, the lengths of the two horizontal partition plates 2 disposed in the collecting pipe 1 can be one-third and two-thirds of the total length of the plate set 31, respectively. In this embodiment, the horizontal partition plate 2 can be a steel sheet; however, in an actual application, the present invention is not limited to above-mentioned example. It should be noted that various equivalent structural changes, alternations or modifications based on the descriptions and figures of present invention are all consequently viewed as being embraced by the spirit and the scope of the present invention set forth in the claims.

Figure 8:
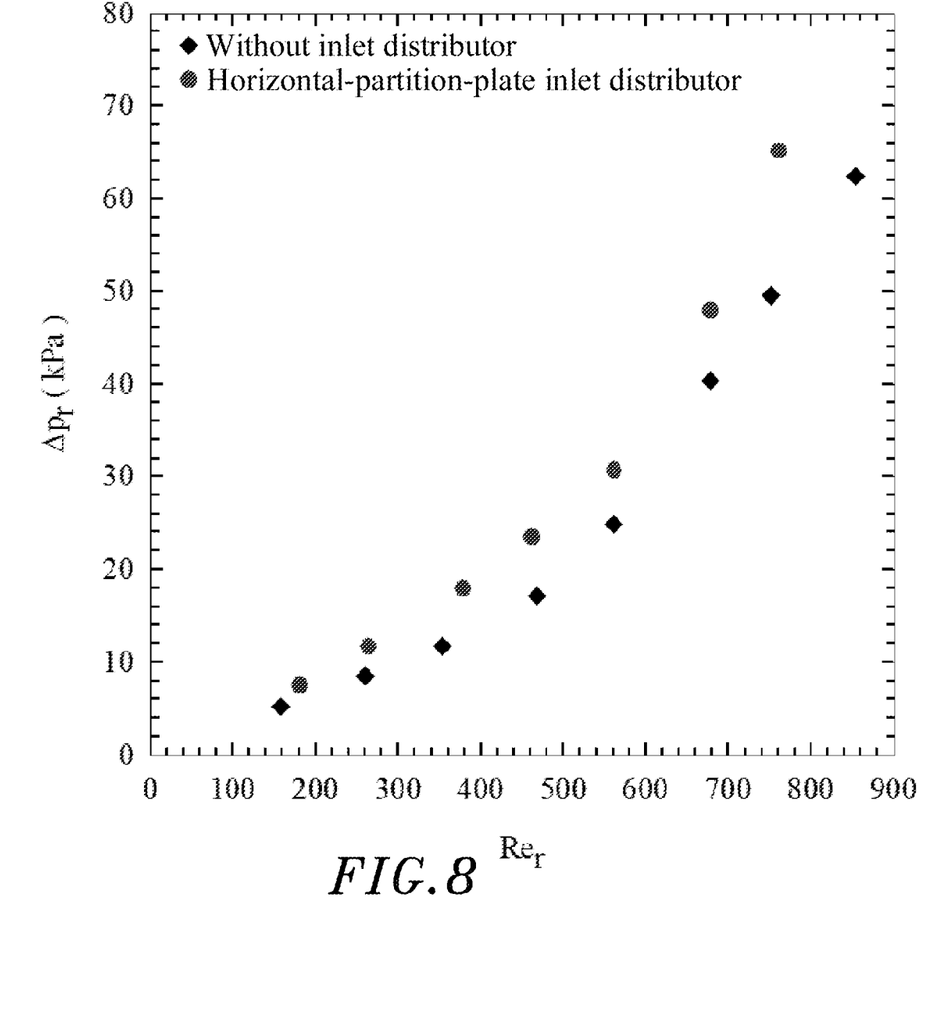
FIG. 8 is a diagram showing the effect of the inlet distributor of the present invention for a pressure drop of refrigerant.
Figure 9:
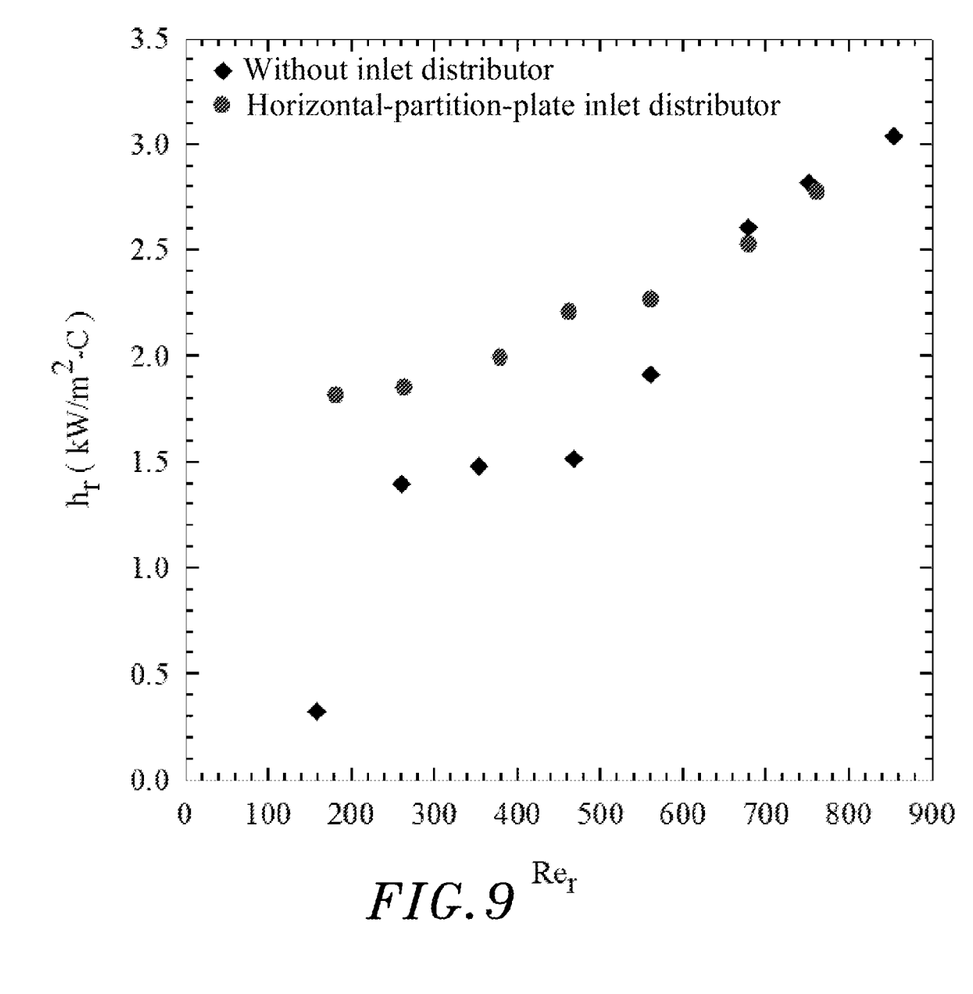
FIG. 9 is a diagram showing the effect of the inlet distributor of the present invention for a heat transfer coefficient of refrigerant.

Please refer to FIGS. 8 and 9, which are diagrams showing the effects of the inlet distributor of the present invention on the pressure drop and the heat transfer coefficient of refrigerant, respectively. As shown in FIGS. 8 and 9, in this embodiment, the performance of the plate heat exchanger is tested and analyzed by experimental method, and the effect of the plate heat exchanger 3 mounted with the horizontal-partition-plate inlet distributor of the present invention at the fluid inlet thereof, as shown in FIGS. 1 and 2, is compared to that of the plate heat exchanger not mounted with the horizontal-partition-plate inlet distributor, as shown in FIG. 10. The comparison result can show how the variation of Reynolds number ($Re_r$) affects the pressure drop ($\Delta P_r$) and the heat transfer coefficient ($W/m^{2 \cdot \circ} C.$) of refrigerant.

According to the experiment results, in a condition that the Reynolds number increases, the pressure drop of the refrigerant increases with a smaller amplification in the plate heat exchanger mounted with the horizontal-partition-plate inlet distributor, than that in the plate heat exchanger not mounted with the horizontal-partition-plate inlet distributor, but the difference is not large. Under the high flow rate, such as the Reynolds number in range of 560 to 860, the mixing degree of the liquid and vapor of the fluid is higher, the fluid can distribute more uniformly in the plate heat exchanger, so the plate heat exchanger mounted with the horizontal-partition-plate inlet distributor has a heat transfer coefficient very close to that of the plate heat exchanger without mounting the horizontal-partition-plate inlet distributor. However, under the middle or low flow rate, such as the Reynolds number in range of 160 to 560, the heat transfer coefficient of the plate heat exchanger mounted with the horizontal-partition-plate inlet distributor is significantly higher than that of the plate heat exchanger without mounting the horizontal-partition-plate inlet distributor, the fluid can distribute in the plate heat exchanger more uniformly, so that the heat transfer performance of the plate heat exchanger can be better, thereby indeed and effectively improving the heat exchange efficiency of the plate heat exchanger.

The key feature of the present invention is mainly to mount the inlet distributor on the collecting pipe 1 of the plate heat exchanger 3 for inflow of the fluid 4, and mount at least one horizontal partition plate 2 on the inner wall of the pipeline 11 of the collecting pipe 1, so that when the fluid 4 flows into the inlet channel 32 of the plate heat exchanger 3 via the collecting pipe 1, the horizontal partition plate 2 can separate the mixed liquid and vapor of the fluid 4 flowing therethrough, and then guide the vapor, along the plate surface of the horizontal partition plate 2, to the fluid channels 310 in different positions away from the inlet end 321, so as to achieve the uniform distribution of the mixture of the liquid and the vapor under middle or low flow rate; furthermore, the horizontal partition plate 2 can reduce the increase of the pressure drop of the fluid, so as to significantly improve the heat transfer performance and effectively increase the heat exchange efficiency.

The present invention disclosed herein has been described by means of specific embodiments. However, numerous modifications, variations and enhancements can be made thereto by those skilled in the art without departing from the spirit and scope of the disclosure set forth in the claims.

What is claimed is:
1. A plate heat exchanger, comprising an inlet distributor and a plate set having plates disposed in interval and face to face, wherein a fluid channel is formed between each two adjacent plates of the plate set, and each of the plates has a plurality of first fluid openings and second fluid openings configured to form a plurality of inlet channels and a plurality of outlet channels for at least one fluid to alternatively flow into and out of the fluid channels for performing heat exchange, wherein the inlet distributor comprises:
   a collecting pipe mounted on an inlet end of one of the plurality of inlet channels, and comprising a pipeline formed in the inside thereof and configured to flow the at least one fluid; and
   a plurality of horizontal partition plates having an end disposed on an inner wall of the pipeline, and an other end coaxially extended partially into the plurality of inlet channels of the plate set, and a plate surface of the plurality of horizontal partition plates corresponding in position to some of the fluid channels are configured to separate liquid and vapor of the at least one fluid flowing through a space between the plurality of horizontal partition plates and the collecting pipe, and guide the vapor, along the plurality of horizontal partition plates, to the fluid channels in different positions away from the inlet end;
   wherein the plurality of horizontal partition plates are disposed on the inner wall of the collecting pipe and arranged in unequal intervals in a vertical direction, and the plurality of horizontal partition plates partition the pipeline to form a plurality of openings having different areas and configured to flow the at least one fluid, and lengths of the plurality of horizontal partition plates are sequentially increased from top to bottom, and layer by layer.

2. The plate heat exchanger according to claim 1, wherein the plurality of horizontal partition plates include upper and lower horizontal partition plates disposed inside the collecting pipe and spaced apart by an interval, and the interval between the upper and lower horizontal partition plates is higher than a maximal interval formed between the upper horizontal partition plate and the pipeline wall in a vertical direction, and is lower than a maximal interval between the lower horizontal partition plate and the pipeline wall in a vertical direction.

3. The plate heat exchanger according to claim 1, wherein the plurality of horizontal partition plates are metal material sheets.

4. The plate heat exchanger inlet distributor according to claim 3, wherein the plurality of horizontal partition plates are made by stainless steel, iron, iron palladium, nickel or nickel-based alloy material.

* * * * *